Figure 1:
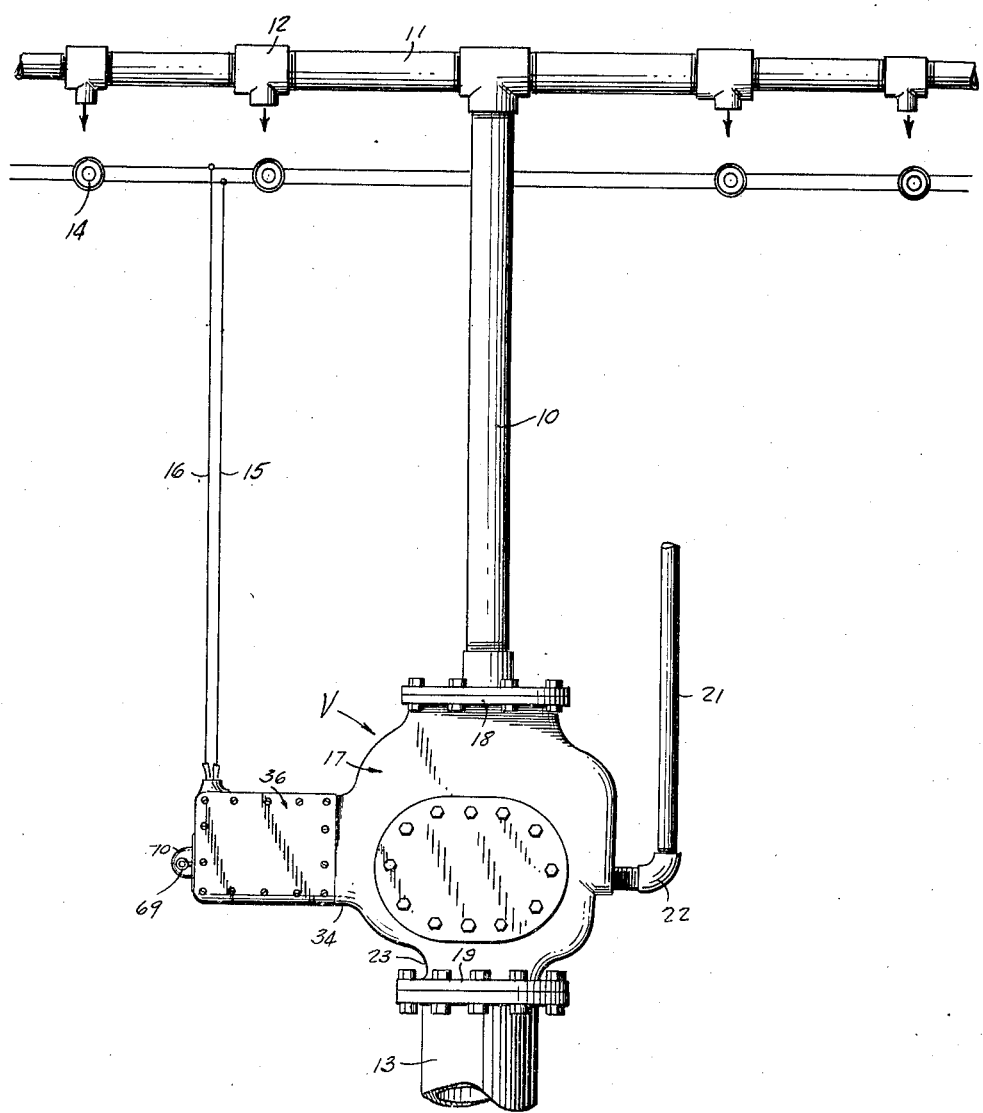

Patented Feb. 22, 1944

2,342,589

UNITED STATES PATENT OFFICE 2,342,589

VALVE FOR FIRE PREVENTIVE SYSTEMS

Leroy M. Lewis, Rosemont, Pa.

Application September 17, 1942, Serial No. 458,741

5 Claims. (Cl. 169—19)

This invention relates to valves such as are employed in fire protective systems, and is concerned primarily with a valve of the so-called "flood" or "deluge" type.

Fire protective systems have, for a long time, been meeting with widespread use by the public. Such systems are ordinarily employed around factories, warehouses, airplane hangars and similar structures, and might be generally characterized as including a fire extinguishing water conduit system which includes a plurality of spray heads that are spaced apart and appropriately located so that when they are opened they will sprinkle water over required areas.

For a long time it had been the practise to have each spray head controlled by some form of fusible unit so that when the temperature at that particular spray head reached a certain predetermined point, the unit would collapse and cause the water to emerge from the spray head to put out the fire.

While such a system would ordinarily function in the manner intended in heated buildings, it is evident that if installed in buildings that are not heated, there is grave danger of the water conduit freezing in the cold season, thus rendering the system useless.

This fact has been recognized and in view thereof, so-called "dry pipe" systems have been installed. In these pipe systems, the water conduits are maintained dry and free from water. This water conduit is connected to a source of water under pressure by a valve, which is known as a flood or deluge valve, and the present invention deals with highly important improvements in such a valve.

At the present time there is available to the public a thermostat known as a "rate of rise" and/or "fixed temperature" thermostat, and these thermostats are meeting with widespread use in fire protective systems of this type. Such a thermostat is shown and described in United States Patent No. 2,132,196, and may be briefly described by noting that it serves to complete an electrical circuit either when a certain predetermined temperature has been reached, or when there is a certain rate of rise of temperature at some range beneath the fixed temperature.

In accordance with this invention, these thermostats are suitably disposed over the area to be protected, and the electrical circuit thereof is connected with a solenoid that controls opening of the deluge valve.

An important object of the invention is the provision of a highly simplified and improved solenoid operated mechanism for controlling opening of the deluge valve.

A deluge valve ordinarily includes a main or clapper valve which is held closed against the pressure of water in a water supply conduit by a dog. When this dog is released, the valve opens under the influence of the water pressure.

An important object of this invention is the provision of new and improved means for controlling release of this dog. Inasmuch as the invention contemplates the use of a solenoid, it is important that this solenoid and the mechanism associated therewith be completely sealed off from any water which might flow through the valve.

Accordingly, an important object is the provision in a deluge valve of the type above-noted, of an operating member that extends through a wall of the valve to control release of the dog, together with suitable means for sealing the operating means in the passage through which it passes. To the ends of simplicity in construction and sureness of operation, the invention proposes the use of an operating member which is so actuated that only a slight amount of movement is necessary to release the clapper controlling dog. In attaining these ends the control lever is moved up out of engagement with the dog rather than being retracted therefrom.

Yet another object is the provision in a deluge valve of the type aforesaid of auxiliary manual operating means which may be employed to release the clapper of the valve, when occasion demands.

Still another object is the provision of an automatically operable switch which discontinues the delivery of current to the solenoid when the valve opens.

Various other more detailed objects and advantages of the invention such as arise in connection with attaining the above-noted objectives will in part become apparent and in part be hereinafter stated as the description of the invention proceeds.

The invention, therefore, comprises a deluge valve including a clapper that is held in closed position by a dog. This dog is maintained in latching position by a control lever. The control lever is actuated by a solenoid and suitable mechanism is provided for operatively connecting the solenoid to the control lever. Provision is made for accurately sealing off the solenoid and associated mechanism from the interior of the valve. An auxiliary manually operable lever is also provided and an automatically operable switch for cutting off current to the solenoid, when the valve is opened, is also included.

Figure 2:
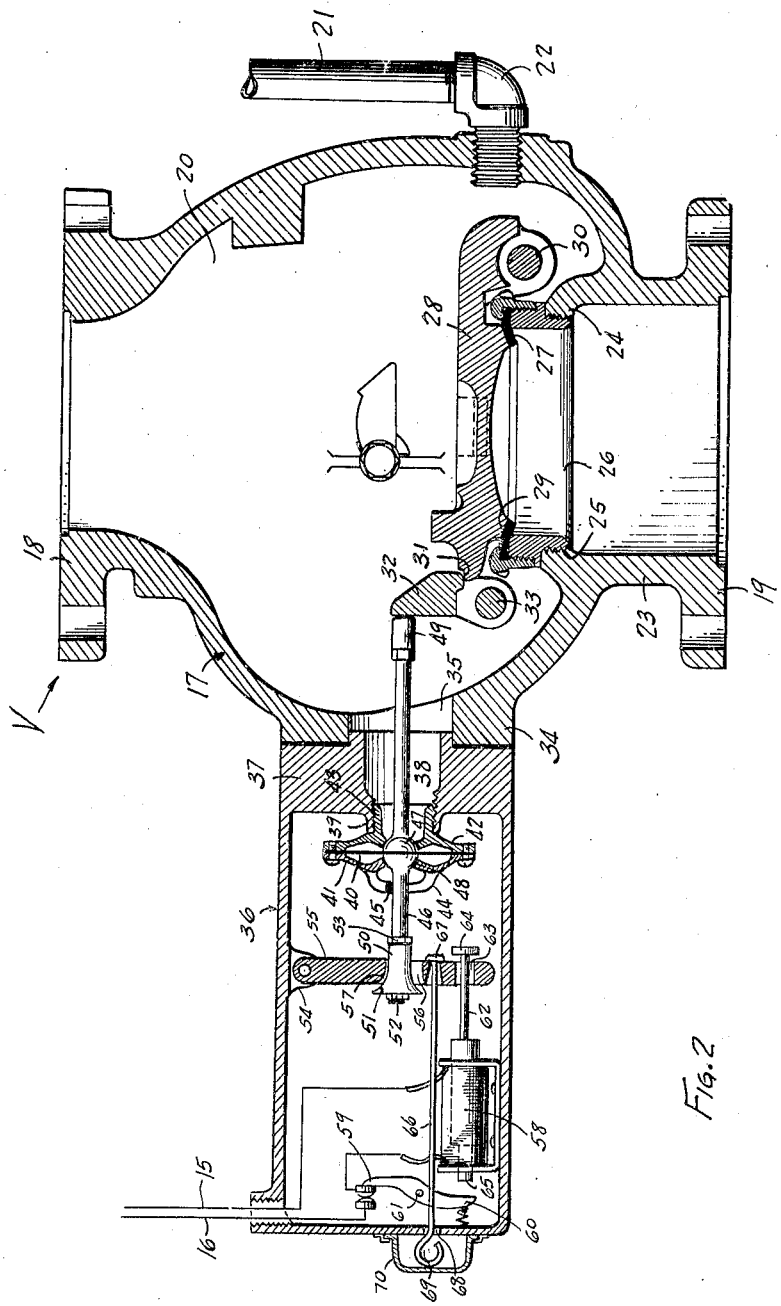

For a full and more complete understanding of the invention, reference may be had to the following description and accompanying drawings wherein:

Figure 1 is an elevational showing, somewhat diagrammatical, of a fire prevention system including the improved deluge valve of this invention, and Figure 2 is a sectional view through the valve and the associated control mechanism.

Referring now to the drawings, wherein like reference characters denote corresponding parts, and first more particularly to Figure 1, the fire preventive system is shown as comprising a main conduit 10 to which is connected a branch conduit 11. This conduit 11 includes a plurality of spray heads 12 which may be maintained opened at all times. It is further noted that the conduits 10 and 11 are ordinarily maintained in a dry state and free from water.

A source of supply of water under pressure is represented at 13 and a deluge valve is generally referred to as V, and is shown as interposed between the supply conduit 13 and the main conduit 10. A plurality of rate of rise and/or fixed temperature thermostats are approximately located over the area to be protected, usually in close proximity to the spray heads 12, and these thermostats are indicated at 14. These thermostats are of the type above described, and are connected to the electrical circuit, including the wires 15 and 16 which lead to the solenoid apparatus that is included in the valve V.

Referring now particularly to Figure 2, the valve V is shown as comprising a valve casing 17 that carries at one end a flange 18 for connecting the valve to the main conduit 10, and at the other end a flange 19 providing a connection to water supply conduit 13. The casing 17 encloses a main valve chamber indicated at 20. A conduit shown at 21 is connected to the casing 17 by an elbow 22 and is in communication with the chamber 20. This conduit leads to a mechanical or electrical alarm so that when water enters the chamber 20 the alarm will be operated. Any suitable type of ball check valve may be included in the elbow 22, for obvious reasons.

A short tubular section 23 is cast integrally with the casing 17 and projects up into the chamber 20 where it terminates in a ring-like flange 24 that is interiorly threaded, as shown at 25. A valve seat ring 26 is screwed into this flange, and on its upper surface carries a gasket-like seal 27 which may be made of any desired material, such as rubber.

A clapper is shown at 28 and includes a ring-like flange 29 that engages the seal 27. The clapper 28 is pivotally mounted on the casing 17 within the chamber 20, the pivot being represented at 30.

Diametrically opposite the pivot 30 the clapper 28 is formed with a detent 31 which is adapted to engage a dog 32 that is pivotally mounted, as shown at 33, on the valve casing 17. It is evident that, under ordinary conditions, the engagement of the dog 32 with detent 31 holds the clapper 28 closed against the pressure of water from the supply conduit 13, and the gasket 27 presents an effective seal preventing any water from entering the chamber 20.

A side wall of the casing 17 is embossed, as shown at 34, and the embossed portion is formed with an opening 35. A housing 36 is shown as connected to this embossed structure 34. The housing 36 includes a thick wall 37 that engages the embossment 34 and the wall 37 is formed with an opening 38 in alignment with the opening 35. A lip 39 projects inwardly from the wall 37, and this lip is interiorly threaded.

A diaphragm 40 is enclosed by plates 41 and 41 that provide a casing therefor. The plate 42 carries a tubular extension 43 that is threaded into the lip 39. The plate 41 carries guides 44 between which extend a stop 45, for a purpose to be later pointed out.

An operating lever 46 is shown as extending through the diaphragm plates 41 and 42, the extension 43 and openings 38 and 35 into the chamber 20. This operating lever 46 includes a ball 47 which has embedded therein the diaphragm 40. Moreover, this ball 47 has close sliding engagement with flanges 48 that project inwardly from the plates 41 and 42. It is evident that the close fit between the ball 47 and the flanges 48 and the diaphragm 40 present an effective seal for preventing any water from passing from the valve chamber 20 into the housing 36.

The end of the control lever 46 which projects into the valve chamber 20 carries an adjustable abutment 49 that engages the dog 32 to hold the latter in effective position. At its other end the control lever 46 carries a sleeve 50 that is formed with a flared end at 51 that presents a cam surface, as will be later pointed out. This sleeve 50 is held in position on the control lever 46 by nuts 52 and 53 which may be adjusted to vary the effective position of the sleeve.

Projecting downwardly from the roof of the housing 36 is an ear 54 on which is pivotally mounted a swinging lever 55. This lever 55 is formed with an opening 56 through which the sleeve 50 passes and the edge of this opening 56, which confronts the flare 51 of the sleeve, is rounded off to provide a cam surface 57. This cam surface 57 is intended for cooperation with the flared end 51 to cause depression of that end of the lever 46 when the lever 55 is swung to the left, speaking with reference to the showing of Figure 2.

The wires 15 and 16 are shown as passing through an appropriate passage in the housing 36 where they are connected to a solenoid 58. It will be noted that the wire 15 is connected directly to the coil of the solenoid while an automatically controlled switch 59 is included in the wire 16 prior to its connection to the solenoid. This control switch 59 includes an abutment lever 60 that is pivotally mounted at 61 on the housing 36.

The solenoid 58 includes an operating plunger 62 that passes through an opening 63 in the lower end of the lever 55, and this plunger 62 carries a head 64 that is adapted to engage the lever 55 and swing it to the left when the plunger 62 is withdrawn into the coil of the solenoid.

It will be noted that this plunger 62 carries an extension 65 on the other end thereof which is adapted to engage the abutment lever 60 of the control switch 59 to break the circuit coincident with inward movement of the plunger 62. The circuit remains broken until the valve 28 is closed and the entire installation reset.

To the end of providing means for manually tripping the control lever 46 independently of the solenoid 58, a link 66 is provided. One end of this link passes freely through an opening in the lever 55 and is formed with a head 67 which engages the lever; the other end of the link 66 passes through an opening 68 in the wall of the housing 36 and exteriorly thereof is formed with a ring 69. The opening in the lever 55 is sufficiently large to provide clearance around the link 66 whereby the lever 55 is free to swing without affecting the link. This ring 69 is ordinarily enclosed within a glass housing 70. Under conditions of danger, the glass 70 may be broken and the ring 69 grasped to pull the link 66 and trip the lever 46 to move the head 49 out of engagement with the dog 32 whereby the latter is forced out of holding position by the pressure of water against the clapper 28.

While the operation of the above-described solenoid and associated mechanism is believed to be obvious, it may be briefly described by noting that when the conditions at any of the thermostats 14 are such as to close the electrical circuit of the wires 15 and 16, the solenoid 58 will be operated to retract the plunger 62. This moves the swinging lever 55 to the left, speaking with reference to the showing of Figure 2. During this movement, the cam surface 57 engages the flared end 51 of the sleeve 52 and depresses that end of the operating lever 46. This raises the head 49 out of engagement with the dog 32, whereby the latter is forced out of holding position by the pressure of water against the clapper 28. As the clapper 28 opens, water passes through the valve chamber 20 into the main conduit 10 and throughout the dry pipe system from which it emerges through spray heads 12. At the same time water passes through the conduit 21 to any mechanical or electrical alarm.

After the clapper 28 is once opened and water passes through the valve V to the dry pipe system, a latch holds the valve clapper 28 open. In order to reset the installation, the source of supply of water is cut off in the conduit 13. Water is then drained from the dry pipe system. The cover of the valve V is now removed and the flange 29 and seal 27 are wiped off by hand. The latch which holds the clapper 28 open is then released manually, and this clapper 28 is brought into position in which it is engaged by the dog 32. The control mechanism for the dog 32 is also manually reset, which necessitates removing the cover of the housing 36, after which the valve casing cover is replaced. The water supply of conduit 13 is then again turned on. This manual resetting of the deluge valve is an absolute requirement of the fire underwriters.

It will be noted that the control lever 46 is ordinarily maintained in a substantially horizontal position by the stop 45 which extends between the vertical guides 44. Due to the sectional showing of the drawings, only one of these guides is shown, but it is noted that the lever 46 is accurately controlled in its vertical movement by the guides 44 and the stop 45.

While a preferred specific embodiment of the invention is hereinbefore set forth, it is to be clearly understood that the invention is not to be limited to the exact constructions illustrated and described, because various modifications of these details may be provided in putting the invention into practice, within the purview of the appended claims.

I claim:

1. In a deluge valve including a valve casing enclosing a chamber and formed with an opening into said chamber, a clapper pivotally mounted in said chamber, and a dog engaging said clapper to maintain said clapper in closed position; mechanism controlling release of said dog comprising a housing affixed on said casing and having a passage in alignment with said opening, an operating lever, means mounting said lever for rocking motion in said housing and having one end extending through said aligned opening and passage into engagement with said dog, a solenoid including a plunger, and means between said plunger and the other end of said lever for rocking said lever.

2. In a deluge valve including a valve casing enclosing a chamber and formed with an opening into said chamber, a clapper pivotally mounted in said chamber, and a dog engaging said clapper to maintain said clapper in closed position; mechanism controlling release of said dog comprising a housing affixed on said casing and having a passage in alignment with said opening, an operating lever, means mounting said lever for rocking motion in said housing and having one end extending through said aligned opening and passage into engagement with said dog, a solenoid including a plunger, a swinging lever depending from the roof of said housing, a cam surface on said swinging lever, a sleeve on the other end of said operating lever and formed with a cam surface complemental to said first mentioned cam surface, and a connection between said plunger and swinging lever.

3. In a deluge valve including a valve casing enclosing a chamber and formed with an opening into said chamber, a clapper pivotally mounted in said chamber, and a dog engaging said clapper to maintain said clapper in closed position; mechanism controlling release of said dog comprising a housing affixed on said casing and having a passage in alignment with said opening, an operating lever, means mounting said lever for rocking motion in said housing and having one end extending through said aligned opening and passage into engagement with said dog, a diaphragm associated with the pivotal mounting of said lever for sealing said passage, a solenoid including a plunger, and means between said plunger and the other end of said lever for rocking said lever.

4. In a deluge valve including a valve casing enclosing a chamber and formed with an opening into said chamber, a clapper pivotally mounted in said chamber, and a dog engaging said clapper to maintain said clapper in closed position; mechanism controlling release of said dog comprising a housing affixed on said casing and having a passage in alignment with said opening, an operating lever mounted for rocking motion in said housing and having one end extending through said aligned opening and passage into engagement with said dog, a ball pivot carried by said lever and constituting a pivotal mounting therefor, a pair of diaphragm plates having flanges in close sliding engagement with said ball pivot, a diaphragm clamped between said plates and embedded in said ball pivot, a solenoid including a plunger, a swinging lever depending from the roof of said housing, a cam surface on said swinging lever, a sleeve on the other end of said operating lever and formed with a cam surface complemental to said first mentioned cam surface, and a connection between said plunger and swinging lever.

5. In a deluge valve including a valve casing enclosing a chamber and formed with an opening into said chamber, a clapper pivotally mounted in said chamber, and a dog engaging said clapper to maintain said clapper in closed position; mechanism controlling release of said dog comprising a housing affixed on said casing and having a passage in alignment with said opening, an operating lever, means mounting said lever for rocking motion in said housing and having one end extending through said aligned opening and passage into engagement with said dog, a solenoid including a plunger, means between said plunger and the other end of said lever for rocking said lever and a cut-off switch connected to said solenoid and positioned for operation by said plunger.

LEROY M. LEWIS.